Patented Aug. 31, 1937

2,091,463

UNITED STATES PATENT OFFICE 2,091,463

WATER-SOLUBLE BASIC TRIPHENYL-METHANE DYESTUFFS

Paul Wolff and Wilhelm Werner, Frankfort-on-the-Main, Germany, assignors to General Aniline Works, Inc., New York, N. Y., a corporation of Delaware No Drawing. Application June 27, 1935, Serial No. 28,770. In Germany June 30, 1934

4 Claims. (Cl. 260—67)

The present invention relates to water-soluble basic triphenylmethane dyestuffs.

We have found that basic triphenylmethane dyestuffs of the following general formula:

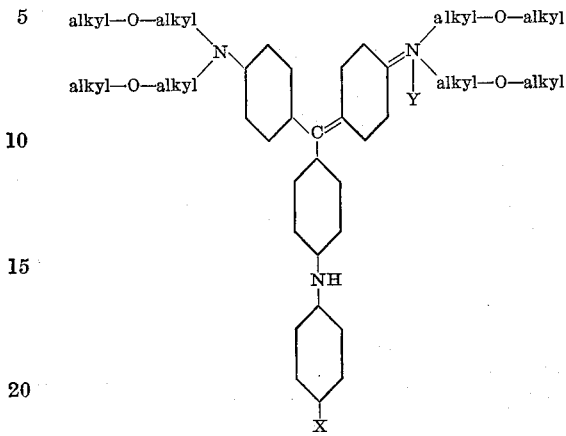

wherein X stands for an alkyl- or an alkoxy group,
Y means the radical of an acid and the benzene nuclei may contain substituents, are dyestuffs of a good solubility in water, very good fastness to light and bright clearness.

These dyestuffs may be prepared, for instance, by condensing a tetra-alkoxyalkylated, substituted or non-substituted para-para'-diaminobenzophenone with a para-alkoxy- or para-alkyldiphenylamine or by exchanging in a tetra-alkoxyalkylated para-para'-diaminotriphenylmethane dyestuff which contains in para-position to the carbinol carbon atom a substituent such as a halogen atom or an alkoxy-, a sulfo- or a NH$_2$-group, this substituent for a para-alkoxyarylamine or a para-alkylarylamine group.

The following examples serve to illustrate the invention, but they are not intended to limit it thereto; the parts are by weight unless otherwise stated:

(1) The leuco-compound which is obtainable by sulfuric acid condensation of para-chlorobenzaldehyde with di-(methoxethyl)-meta-toluidine, is oxidized in known manner with lead peroxide to form a green dyestuff. 30 parts of this green dyestuff are melted with 40 parts of para-toluidine at about 120° C. until the green color has passed. The conversion is finished after about 3 to 4 hours. After the excess of para-toluidine has been removed, there is obtained a dyestuff of the following formula:

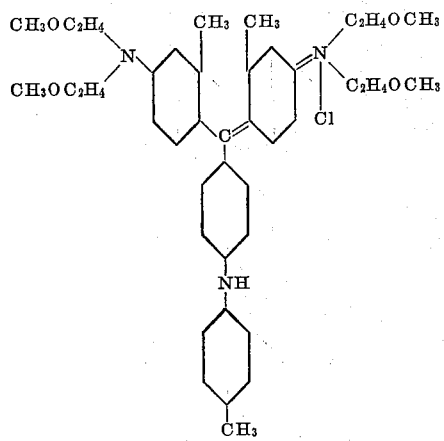

which is very easily soluble in water and dyes tannin-mordanted cotton, wool and silk bright greenish-blue tints of very good fastness to light.

Instead of di-(methoxethyl)-meta-toluidine there may also be used di-(ethoxethyl)-aniline whereby a similar dyestuff is obtained.

(2) By condensing 4,4'-tetramethoxethyl-2,2'-dimethylbenzophenone with para-tolylphenylamine in the presence of phosphorus oxychloride, a blue dyestuff is obtained which as regards the solubility in water, shade and fastness to light has the same properties as the dyestuff described in Example 1.

(3) By condensation of para-methoxybenzaldehyde with di-(methoxethyl)-meta-toluidine a leuco compound is obtained which may be oxidized with lead peroxide to form a green dyestuff. By melting this dyestuff with para-phenetidine in the manner described in Example 1 a blue water-soluble dyestuff is obtained which dyes tannin-mordanted cotton, wool and silk bright blue tints which are somewhat more greenish than those obtained with the dyestuff described in Example 1. The dyestuff has a very good fastness to light.

By using, instead of para-phenetidine, para-anisidine a similar dyestuff is obtained.

We claim:
1. The compounds of the general formula:

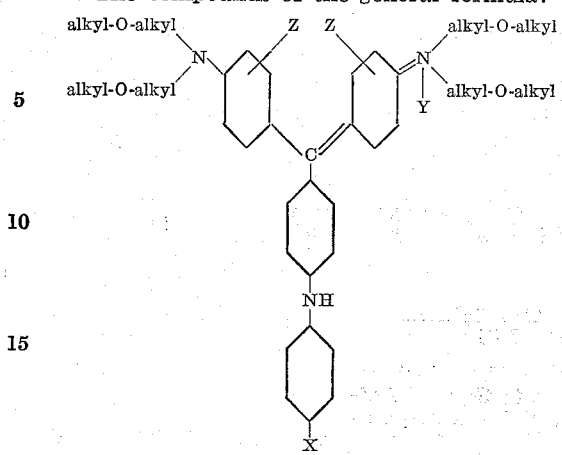

wherein alkyl means a member of the group consisting of methyl and ethyl, X represents a member of the group consisting of methyl, ethyl, methoxy and ethoxy, Y means the radical of an inorganic acid and Z represents a member of the group consisting of hydrogen and methyl, being water soluble dyestuffs yielding dyeings which are very fast to light and have bright shades.

2. The compound of the formula:

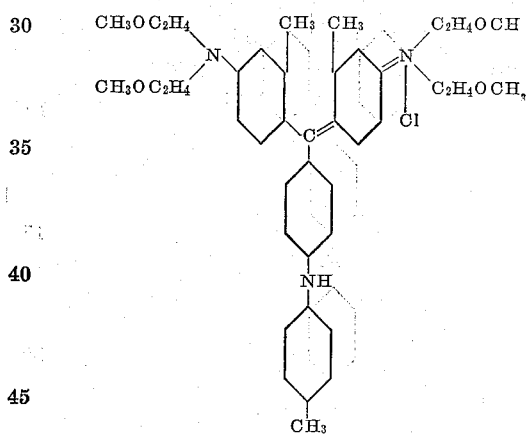

being very easily soluble in water and dyeing tannin-mordanted cotton, wool and silk bright blue tints of very good fastness to light.

3. The compound of the formula:

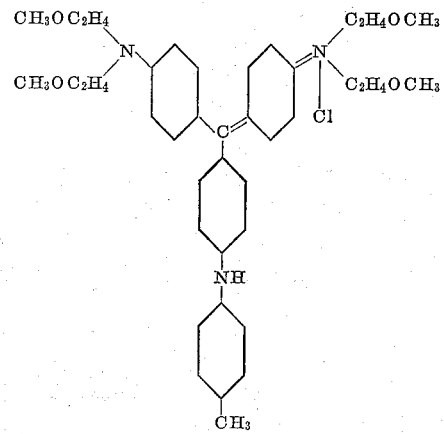

being very easily soluble in water and dyeing tannin-mordanted cotton, wool and silk bright blue tints of very good fastness to light.

4. The compound of the formula:

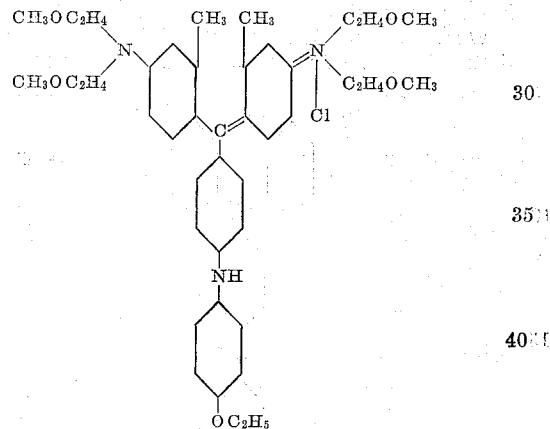

dyeing tannin-mordanted cotton, wool and silk bright blue tints of very good fastness to light.

PAUL WOLFF.
WILHELM WERNER.